United States Patent [19]

Mostafa

[11] 4,361,656

[45] Nov. 30, 1982

[54] METHOD OF MAKING EXPANDABLE STYRENE-TYPE POLYMER BEADS

[75] Inventor: Mohamed A. Mostafa, Leominster, Mass.

[73] Assignee: American Hoechst Corporation, Leominster, Mass.

[21] Appl. No.: 373,948

[22] Filed: May 3, 1982

Related U.S. Application Data

[63] Continuation-in-part of Ser. No. 289,635, Aug. 3, 1981, abandoned.

[51] Int. Cl.$^3$ .............................................. C08J 9/16
[52] U.S. Cl. ...................................... 521/57; 427/222; 521/56; 521/60; 521/92; 521/97; 521/146
[58] Field of Search ............................ 521/56, 57, 60; 427/222

[56] References Cited

U.S. PATENT DOCUMENTS

| | | | |
|---|---|---|---|
| 2,989,782 | 6/1961 | Barkhuff, Jr. et al. | 18/48 |
| 3,183,208 | 5/1965 | Jurgeleit | 521/60 |
| 3,389,097 | 6/1968 | Ingram et al. | 260/2.5 |
| 3,461,088 | 8/1969 | Stahnecker et al. | 260/2.5 |
| 3,468,820 | 9/1969 | Buchholz et al. | 260/2.5 |
| 3,480,570 | 11/1969 | Roberts et al. | 260/2.5 |
| 3,503,908 | 3/1970 | Ingram et al. | 260/2.5 |
| 3,789,028 | 1/1974 | Heiskel et al. | 260/2.5 B |
| 3,991,020 | 11/1976 | Alvares et al. | 260/2.5 B |
| 4,042,541 | 8/1977 | Watts | 260/2.5 B |
| 4,174,427 | 11/1979 | Davis et al. | 521/56 |
| 4,238,570 | 12/1980 | Shibata et al. | 521/57 |
| 4,241,191 | 12/1980 | Keppler et al. | 521/60 |
| 4,312,957 | 1/1982 | Spicuzza, Jr. | 521/60 |

FOREIGN PATENT DOCUMENTS

| | | |
|---|---|---|
| 52-33958 | 3/1977 | Japan . |
| 53-64277 | 6/1978 | Japan . |
| 55-125129 | 9/1980 | Japan . |

*Primary Examiner*—Morton Foelak
*Attorney, Agent, or Firm*—Tatsuya Ikeda

[57] ABSTRACT

Expandable styrene-type polymer beads having a short cooling time are obtained by a method wherein styrene-type polymer beads are impregnated with a blowing agent preferably as a step separate and independent of the polymerization step or in the same suspension polymerization reactor after a substantial completion of the polymerization, in an aqueous suspension comprising styrene-type polymer beads, a blowing agent, a suspending agent, at least 0.0001% of a halide salt of a transition metal selected from the group consisting of iron, titanium, vanadium, chromium, manganese, cobalt, nickel and copper, or a mixture thereof, and at least 0.001% of glycerol mono-, di-, or tri-ester of a fatty acid having 12–30 carbon atoms or a mixture thereof, said halide being bromide, chloride or iodide, and said percentages being based on the total weight of polymer beads subjected to the impregnation, with the proviso that if said glycerol ester is a tri-ester, there must be present at least 0.0001% of a bromide salt of said transition metal or a mixture thereof.

34 Claims, No Drawings

METHOD OF MAKING EXPANDABLE STYRENE-TYPE POLYMER BEADS

BRIEF SUMMARY OF THE INVENTION

This is a continuation-in-part of application Ser. No. 289,635 filed Aug. 3, 1981, and now abandoned.

TECHNICAL FIELD

This invention relates to a method for making expandable styrene-type polymer beads having a short cooling time wherein styrene-type polymer beads are impregnated with a blowing agent preferably as a step separate and independent of the polymerization step or in the same suspension polymerization factor after a substantial completion of the polymerization, in an aqueous suspension comprising styrene-type polymer beads, a blowing agent, a suspending agent, at least 0.0001% of a halide salt of a transition metal selected from the group consisting of iron, titanium, vanadium, chromium, manganese, cobalt, nickel and copper, or a mixture thereof, and at least 0.001% of glycerol mono-, di-, or tri-ester of a fatty acid having 12–30 carbon atoms or a mixture thereof, said halide being bromide, chloride or iodide, and said percentages being based on the total weight of polymer beads subjected to the impregnation, with the proviso that if said glycerol ester is a tri-ester, there must be present at least 0.001% of a bromide salt of said transition metal or a mixture thereof.

BACKGROUND ART

The making of expandable particles of styrene-type polymers is well known. It comprises two basic aspects, polymerization of styrene-type monomer and the impregnation of the polymer with a blowing agent. The polymerization reaction is usually conducted either in bulk or in suspension. Where the bulk polymerization method is used to prepare the polymer the impregnation step is usually conducted in a separate reactor. In the case of the suspension polymerization method the impregnation may be carried out either as a step contiguous to the polymerization by introducing the blowing agent to the reactor at a certain point in the conversion of monomer to polymer or at the completion of the polymerization, or as a step completely separate and independent of the polymerization. In the latter case, the bead product of the suspension polymerization is taken from the reactor, washed, and the impregnation step is conducted by re-suspending the polymer in water. The latter method has the advantage that out of the total polymer beads obtained from the suspension polymerization, one can select only those beads having a particle size suitable for expandable styrene-type polymer usage and use the rest for other purposes.

The impregnated particles are usually pre-expanded and aged before molding to stabilize the bead structure and control the final density of the molded article. The molding step is conducted by filling the mold cavity with the pre-expanded polymer particles and heating them above the softening point usually by use of superheated steam. The minimum time period, after the introduction of steam into the mold, that the article must remain in the mold before removal is generally called the "cooling time". The cooling time is often a very substantial portion of the molding cycle and hence the reduction thereof has an important commercial significance for enhancing production efficiency.

Barkhuff et al. U.S. Pat. No. 2,989,782 discloses expandable polystyrene beads which yield molded resin foam articles having high strength at elevated temperatures, the surface shell only of said beads containing a compatible organic compound that is soluble in the polystyrene resin. Various classes of compounds are broadly described as suitable for said "compatible organic compound". Mentioned among them are fatty acids and esters thereof including monoglycerides of 12 to 20 carbon atom fatty acids.

Ingram et al. U.S. Pat. No. 3,389,097 describes a method of making fast-cooling expandable polystyrene beads wherein styrene monomer is polymerized in an aqueous suspension system up to a point between about 60–95% monomer conversion and then a fatty acid bisamide is added to the system and the polymerization completed and the impregnation is separately conducted after the completion of the polymerization.

Stahnecker et al. U.S. Pat. No. 3,461,088 describes a method of making fast-cooling expandable polystyrene beads wherein polystyrene beads which have been or are being pre-expanded are coated with an organic compound having a boiling point of more than 95° C. and a softening point of not more than 120° C. A large number of such organic compounds suitable for the invention are disclosed in the patent including esters of fatty acids and aliphatic hydrocarbons substituted by at least one hydroxy group.

Buchholz et al. U.S. Pat. No. 3,468,820 describes a method of suspension-polymerizing styrene in the presence of a blowing agent and 0.001 to 1% of a water-insoluble high molecular weight polymer of a vinyl ester, vinyl ether, acrylic ester, or methacrylic ester which is soluble in the monomer but is not homogeneously miscible with the polymer obtained. The patent discloses that the resultant polymer has fine and uniform cells and also a relatively short cooling time.

Roberts et al. U.S. Pat. No. 3,480,570 describes a method of coating expandable polystyrene beads with 0.02–0.3% by weight of sorbitan fatty acid ester containing 12–18 carbon atoms in the fatty acid moiety and having an HLB (hydrophilic-lipophilic balance) number of 1.5–9. The patent discloses that the cooling time is reduced typically to 50–80% of the "normal" value.

Ingram et al. U.S. Pat. No. 3,503,908 (British Pat. No. 1,174,749) describes a method of making fast-cooling expandable polystyrene beads wherein the impregnation is conducted in an aqueous suspension system comprising a surface-active agent selected from the group consisting of polyoxyethylene mono-esters of fatty acids, polyoxyethylene sorbitan mono-esters of fatty acids, and polyoxyethylene mono-ethers of fatty alcohols said compounds having an HLB (hydrophilic-lipophilic balance) number of at least about 15.

Heiskel et al. U.S. Pat. No. 2,789,028 describes expandable polystyrene beads having a short cooling time comprising as a surface coating agent 0.05–0.5% by weight, based on the blowing agent containing styrene polymer, of a mixture of mono-, di- and tri-esters of glycerol with saturated fatty acids having 12–22 carbon atoms. As examples of methods of applying the coating agent there are mentioned a method of applying powdery coating agent onto the beads by means of a rotating drum and a method of treating the expandable beads with a solution of the coating agent in a solvent.

Alvares et al. U.S. Pat. No. 3,991,020 discloses an expandable polystyrene composition wherein 0.005-1.0% (based on the weight of polystyrene) of a polyether derived from propylene oxide or from propylene oxide and ethylene oxide is homogeneously dispersed on at least the surface of the expandable particles. The admixture of polyethers and polystyrene is prepared by mixing the expandable polystyrene particles with the additive, or a portion of the additive may be incorporated in the polystyrene during polymerization and the remaining portion added to the subsequent mixture. This patent also discloses a process for preparing expandable polystyrene wherein the monomer is polymerized in aqueous suspension, a blowing agent is admixed with the polymer formed during and/or at the end of the polymerization, and the polymer containing the expanding agent is separated from the suspension medium and subsequently mixed with 0.005-1.0% by weight of polyethers derived from propylene oxide or from propylene and ethylene oxides. The main advantages discloses in this patent are that the expandable beads have an anti-lumping property during the pre-expansion and a short cooling time.

Japan Kokai No. 33958/1977 describes expandable polystyrene beads having a good fusion property wherein 0.2-2 weight % of a fatty acid partial ester of glycerol, glycerol dimer or sorbitan is attached to the surface of the beads, and also a method of making same wherein polystyrene beads which have already been impregnated with a blowing agent are suspended in an aqueous system containing a fatty acid partial ester of glycerol, glycerol dimer or sorbitan and an anionic surfactant, and after the mixture has been stirred for a sufficient length of time the beads are collected.

Japan Kokai No. 64277/1978 describes expandable polystyrene beads having a good fusion property wherein the surface of the polymer beads is coated with a glycerol tri-ester of a higher fatty acid. Said glycerol tri-ester is applied to the surface of the polymer beads which have already been impregnated with a blowing agent.

Japan Kokai No. 125,129/1980 describes a method of making expandable thermoplastic polymer beads wherein, during or subsequent to the impregnation of a blowing agent to thermoplastic polymer beads, a nucleating agent is incorporated into the thermoplastic polymer beads containing the blowing agent at a temperature above the softening point of the beads. Among examples of suitable nucleating agent to be incorporated into the thermoplastic polymer beads impregnated with a blowing agent, there are mentioned esters of glycerol, pentaerythritol, and sorbitan including glycerol monostearate, pentaerythritol mono-stearate and sorbitan mono-stearate.

Watts U.S. Pat. No. 4,042,541 discloses expandable polystyrene beads having a reduced cooling time containing, uniformly dispersed within the beads, from about 100 to 300 ppm of stearic acid and from about 40 to 120 ppm of calcium stearate.

Davis et al. U.S. Pat. No. 4,174,427 discloses a method for making expandable polystyrene beads suitable for making drinking cups and other impervious containers wherein the polymerization of styrene is conducted in the presence of polyvinyl pyrrolidone, and, after impregnation, the beads are washed in an aqueous solution of a hydrophilic alkoxylated nonionic surfactant, which is solid at room temperature and has 70-90 weight percent of the polymer chain accounted for by oxyethylene units, for about 3 to 10 hours at a temperature of 40°-55° C. to remove contaminated grafted polyvinyl pyrrolidone from the surface of said beads. The primary purpose of this patented process is to obtain polystyrene beads which are expandable into impervious containers and which are free from mold-filling and static-electricity problems.

Shibata U.S. Pat. No. 4,238,570 describes expandable particles of a styrene polymer having a short cooling time which comprise on the surface thereof, an ester obtainable from an aliphatic carboxylic acid and an aliphatic alcohol, the ester having no hydroxyl group in the molecule and being a solid at room temperature or a mixture of said ester and a finely divided lubricant. As a preferred method of incorporating the ester of an aliphatic carboxylic acid with an aliphatic alcohol onto the surface of the expandable particles of a styrene polymer, mentioned therein is a method in which the ester in a powdery state is mixed mechanically with the expandable polymer beads.

Spicuzza U.S. Pat. No. 4,312,957 describes a process of making fast-cooling expandable polystyrene beads, wherein a synergistic mixture of surfactants, comprising (1) a first surfactant selected from the group consisting of polyoxyethylene sorbitan monoesters of fatty acids, polyoxyethylene monoesters of fatty acids and polyoxyethylene monoethers of long-chain fatty alcohols, and (2) a second surfactant selected from the polyoxyethylene monoethers of alkylphenols, is incorporated into styrene polymer particles during the process of impregnating the particles with a blowing agent.

DISCLOSURE OF THE INVENTION

I have developed a method for preparing expandable styrene-type polymer beads having a short cooling time wherein the impregnation of the beads with a blowing agent is carried out in suspension, preferably as a step separate and independent of the polymerization step or in the same suspension polymerization reactor after a substantial completion of the polymerization, in an aqueous suspension comprising styrene-type polymer beads, a blowing agent, a suspending agent, at least 0.0001% of a halide salt of a transition metal selected from the group consisting of iron, titanium, vanadium, chromium, manganese, cobalt, nickel and copper, or a mixture thereof, and at least 0.001% of glycerol mono-, di-, or tri-ester of a fatty acid having 12-30 carbon atoms or a mixture thereof, said halide being bromide, chloride or iodide, and said percentages being based on the total weight of polymer beads subjected to the impregnation, with the proviso that if said glycerol ester is a tri-ester, there must be present at least 0.0001% of a bromide salt of said transition metal or a mixture thereof. The resultant expandable polymer beads are subsequently washed with water and dried.

I have discovered that the use of said inorganic salts in combination with said glycerol esters in the aqueous suspension medium gives expandable styrene-type polymer beads having shorter cooling time than those prepared in the presence of either of them alone. Preferred species of said inorganic salts include halide salts of iron, titanium, vanadium, chromium and manganese. More preferred species include halide salts of Fe(III), Ti(IV), Cr(III) and Mn(III). For a given transition metal cation, bromide is preferable to chloride and iodide.

Preferred species of said glycerol esters include glycerol mono- and di-esters of fatty acids having 12–30 carbon atoms.

DETAILED DESCRIPTION OF THE INVENTION

"Styrene-type" compound as used herein means a vinyl aromatic compound with or without a substituent or substituents on the aromatic nucleus or on the vinyl group. Thus, styrene-type compound includes such compounds as styrene, α-methyl styrene, o-, m- and p-methyl styrene, indene, o-, m- and p-ethyl styrene and o-, m- and p-isopropyl styrene. "Styrene-type polymer" as used herein means a polymer which is essentially a homopolymer of a styrene-type compound, a copolymer obtained from a mixture of styrene-type compounds, a copolymer comprising in chemically combined form at least 50% and preferably at least 70% by weight of one of the styrene-type compounds, or a mixture of such homopolymer(s) and copolymer(s). Thus, a certain amount of non-styrene-type monomer(s) may be used in obtaining said styrene-type polymers, and also additives may be present in said styrene-type polymers.

The styrene-type polymer to be used in the method of this invention may be obtained in any suitable polymerization method. Where a styrene-type polymer is obtained by bulk polymerization, the polymer must be formed into a desired shape and size before impregnation, and the impregnation is conducted as a separate step following polymerization. A typical method employed for this purpose is to extrude the polymer through a die having circular holes, cool the resultant strands, and then cut the strands to the desired length. Where the product of suspension polymerization is employed in the method of this invention, the impregnation process may be conducted either within the same reactor used for the suspension polymerization by introducing a blowing agent into the reactor after a substantial completion of polymerization, or it may be conducted as a separate step. The latter method, however, has the advantage that one can select for impregnation purpose only those beads which fall within a desired size range.

The method of the present invention is not limited by any specific size or shape of the styrene-type polymer "beads". The term "bead" as used herein should be construed very broadly as to size and shape. Thus, "beads" shall include, for instance, spherical beads and cylindrical beads. Spherical beads, however, are usually preferred over cylindrical beads. Thus, for the purpose of this invention it is usually preferable to use the product of suspension polymerization rather than that of bulk polymerization, and it is also preferable to conduct the impregnation as a step separate from and independent of the suspension polymerization. The preferred range of the bead size before pre-expansion depends upon the specific application but typically it is 0.35–1.4 mm in diameter (or the respective length).

The phrase "substantial completion of polymerization" as used herein shall mean that the solids content of the polymer beads has reached at least about 90%.

Various suspending agents may be used for the impregnation step of this invention. Typical examples include polyvinyl alcohol and tricalcium phosphate. Polyvinyl alcohol has an advantageous aspect that it is water soluble and hence can be removed from the surface of the beads by washing the beads with water.

Where tricalcium phosphate is used as a suspending agent, usually the collected beads are first washed in acidic water to dissolve tricalcium phosphate and then the beads are washed thoroughly with neutral water. Alternatively, the entire suspending medium may be acidified before collecting the beads.

Where the impregnation is conducted in suspension separately from the polymerization step the ratio between the weight of the beads and that of the suspension medium is of the order of 1:1. Where the impregnation is conducted in the same reactor after a substantial completion of the suspension polymerization, said ratio is also of the order of 1:1.

An essential requirement of this invention is that there be added to the aqueous suspension medium used for the impregnation of styrene-type polymer beads, a blowing agent, a suspending agent, at least 0.0001% of a halide salt of a transition metal selected from the group consisting of iron, titanium, vanadium, chromium, manganese, cobalt, nickel and copper, or a mixture thereof, and at least 0.001% of glycerol mono-, di-, or tri-ester of a fatty acid having 12–30 carbon atoms or a mixture thereof, said halide being bromide, chloride or iodide, and said percentages being based on the total weight of polymer beads subjected to the impregnation, with the proviso that if said glycerol ester is a tri-ester, there must be present at least 0.0001% of a bromide salt of said transition metal or a mixture thereof.

For the sake of convenience, the term "glyceride compound" shall be used herein to mean glycerol mono-, di-, or tri-ester of a fatty acid having 12–30 carbon atoms or any mixture thereof. Said fatty acids may contain one or more double bonds.

I have discovered that the combined use of said transition metal halide and said glyceride compound in the impregnation system is effective for reducing the cooling time of the resultant expandable styrene-type polymer beads, namely, the combination of the two types of ingredients gives a cooling time shorter than those obtained from the use of either type of ingredient alone. For instance, as shown in Examples 1 and 2, a combined use of ferric bromide and a glyceride compound gives a cooling time significantly shorter than those obtained from either ferric bromide or the glyceride compound.

Preferred species of said inorganic salts include halide salts of iron, titanium, vanadium, chromium, and manganese. More preferred species include halide salts of Fe(III), Ti(IV), V(III), Cr(III) and Mn(III). For a given transition metal cation, preferred species of said transition metal halides include bromide salts of Fe(III), Ti(IV), V(III), Cr(III) and Mn(III). It is not essential that an isolated (pure) form of such bromide compound be used in this invention. Namely, a transition metal bromide may be synthesized, for instance, via double decomposition reaction by mixing in water a water-soluble non-bromide transition metal salt and a water-soluble bromide of another metal (which is not one of the transition metals specified in this invention) such as alkali metal or alkaline earth metal, and the resultant mixed product may be used as a substitute for the pure form of the transition metal bromide. The same thing can be said for transition metal chlorides and iodides. Where a double decomposition is conducted between a non-halide transition metal salt and a halide of another metal and the product mixture is used in this invention, the concentration of the transition metal halide present in the impregnation system shall be assumed, for the purpose of interpreting the scope of this invention, to be equal to the one which would be realized if the double decomposition reaction proceeded irreversibly to a hypothetical completion. A double decomposition involving two different halogen ions may also be conducted. For example, a double decomposition product from ferric chloride and potassium bromide may be used as a substitute for ferric bromide.

In practicing the method of this invention, it is much preferred, for the purpose of effective reduction of the cooling time, to have the salt or salts come in direct contact with the glyceride compound prior to charging them to the impregnation system. In other words, it is much preferred to separately prepare a premix of the salt and the glyceride compound instead of charging them separately to the impregnation system shortly before the start of the impregnation. Said premix is made by physically blending the salt in dry powder form with the glyceride compound. Where the melting point of the glyceride compound is substantially above the room temperature, said premix may be prepared by first warming the glyceride compound to a soft pasty state and then adding the salt thereto, followed by a good stirring to obtain a uniform mixture. Such a premix can be stored at room temperature for a long time. Where the glyceride compound is a solid at room temperature, it is convenient, from the standpoint of the ease of handling of materials, to convert the premix into an emulsion or dispersion form before using the premix in the impregnation system. In preparing such emulsion or dispersion, it is much preferred to prepare first a premix of the salt and the glyceride compound and then add the premix to an aqueous system containing a surface active agent such as polyvinyl alcohol instead of adding the salt and the glyceride compound independently to the aqueous system.

As mentioned earlier, besides an isolated (pure) form of transition metal halides, one can also use an in situ prepared form of such compounds. Namely, for instance, instead of using an isolated (pure) form of ferric bromide one can use the product of a double decomposition obtained by reacting a water-soluble ferric salt such as ferric chloride with a water-soluble bromide salt such as potassium bromide and magnesium bromide. In such a situation it is preferred to prepare such a compound by mixing in water a transition metal salt with a bromide salt of another metal and then drive off the water to obtain a dry solid product and then add the dry solid product to glyceride compound to prepare a premix which is subsequently used in the impregnation premix. This method generally gives better results than a method where the respective starting salts are directly added to the impregnation system or a premix is prepared from the glyceride compound and the respective starting salts without first making a double decomposition product from the respective salts.

From practical considerations, halides of iron are generally preferable to those of the other transition metals. Particularly, combinations of $FeBr_3$ with glycerol mono- or di-esters of fatty acids having 12–22 carbon atoms are most preferred. I have observed that, generally speaking, it is preferable to have a source of bromide ion in the impregnation system. Namely, in general, $FeBr_3$ is preferable to $FeCl_3$; $FeBr_2$ is preferable to $FeCl_2$; and a combination of $FeCl_3$ with KBr is preferable to $FeCl_3$ alone for a given concentration of iron salt.

Where the concentration of the transition metal halide is below 0.0001%, or that of the glyceride compound is below 0.001%, the cooling time reduction effect is minimal. A preferred concentration range of the transition metal halide is 0.001–0.1%. A preferred concentration range of the glyceride compound is 0.01–0.5%. Excessive use of the ingredients beyond said preferred ranges tend to bring about undesirable effects. For instance, it leads to an economic loss due to waste of the material and the loss of desired properties such as low shrinkage and good fusion of the molded article.

Among the glyceride compounds used in this invention, glycerol esters of fatty acids having 12–22 carbon atoms are preferred. More preferred species are glycerol esters of fatty acids having 16–18 carbon atoms. I have observed that generally speaking, the mono- and di-esters are preferred over the tri-esters of glycerol for the purpose of this invention. In other words, it is preferable that the glycerol ester molecule have one or more residual hydroxy groups. Thus, it is preferable to have in the impregnation system 0.01–0.5%, and more preferably 0.1–0.2%, of glycerol mono- or di-ester of a fatty acid having 12–22 carbon atoms or a mixture thereof.

It is to be noted this invention is directed to a method where the glyceride compound and the metal compound come into contact with the polymer beads during the impregnation step, and hence before the pre-expansion of the impregnated beads. This invention is not directed to a method where a chemical substance is applied to the outer surface of expandable polymer beads after the completion of the impregnation step either before or after the pre-expansion step.

Various blowing agents may be used in this invention. Preferred blowing agents include n-pentane, iso-pentane and mixtures thereof. Suitable process conditions for the impregnation of polystyrene beads including temperature, time and the amount of blowing agent with respect to the amount of polymer beads are well known in the art. Where styrene homopolymer beads of size range 0.35–1.4 mm are impregnated with n/isopentane mixture, the preferred condition is typically the following: temperature 90°–120° C., time 2–6 hours., weight of pentane mixture absorbed 1–10% of the weight of the polymer beads.

After the impregnation is completed, the polymer beads are collected and washed thoroughly with water to remove residual substances from their surface.

Pre-expansion is conducted usually about one (1) day before the molding. The temperature of the pre-expansion process is typically 90°–100° C. The length of time allowed for pre-expansion is determined by, inter alia, the target value of the bulk density of the pre-expanded beads. Typically a suitable bulk density of the pre-expanded beads is in the range of 0.8–2.5 $lb/ft^3$.

The art of the molding of the pre-expanded bead is well known. The optimum steam pressure varies somewhat with each sample, but it is typically in the range of 0.7–1.2 atm. gauge. Insufficient or low steam pressure tends to cause poor fusion of the beads and too high a pressure tends to cause shrinkage and burning (partial melting) of the expanded product. The mold cavity usually has a pressure transducer which monitors the pressure exerted on the cavity wall by the molded article during the mold cycle.

Styrene-type polymer bead may contain a flame-retardant. I have observed that the method of this invention is suitable for preparing such modified styrene-type polymers containing flame-retarding agent as well as unmodified styrene-type polymers. Examples of flame-retarding agents suitable for use in styrene-type polymers are well known. They include organic bromides containing at least four carbon atoms and a plurality of bromine atoms attached to the carbon atoms. Organic bromides having low volatility, little or no plasticizing effect on the styrene-type polymer, and no unpleasant odor are particularly suitable.

The styrene-type polymers may also contain other additives such as dyes, fillers and stabilizers.

It should be pointed out at this point that generally speaking the cooling time is influenced by various other factors besides the ingredients used in the impregnation system including the molding pressure (pressure of the superheated steam introduced to the molding apparatus), the temperature at which the impregnation is conducted, the bead size distribution of the feedstock polymer beads subjected to the impregnation, and presence of flame retarding agent in the impregnated beads. With regard to the effect of molding pressure, it has been my experience that the cooling time values of control runs (namely, runs where the transition metal halide and the glyceride compound are absent from the impregnation system) are generally affected by molding pressure to a larger extent than the cooling time values of runs embodying the method of this invention. Therefore, it is important in ascertaining the advantage of the method of this invention to make comparisons only within a given series of runs conducted under similar experimental conditions.

It is an advantage of this invention that not only the cooling time is generally reduced but also the extent to which the cooling time is influenced by molding pressure or impregnation temperature is made smaller by this invention than the extent to which the cooling time values of control runs are influenced by these factors. In other words, the cooling time values of beads prepared in accordance with the method of this invention are generally less sensitive to variations of molding pressure and impregnation temperature than the cooling time values of the corresponding control runs. This advantageous aspect of this invention is very significant from various standpoints including quality control of the expandable beads, quality control of the molded article and energy savings.

The following examples are given for the purpose of illustrating the present invention.

EXAMPLE 1

A clean ten-ounce beverage bottle is charged with a 100 g sample of feedstock polystyrene beads having a size range of 16–30 mesh, 100 ml of distilled water, 12 ml of mixed pentane, 3 ml of 5% polyvinylalcohol aqueous solution and 0.2 ml of a premix prepared by blending, at 1:10 weight ratio, ferric bromide and ®Myverol 18-85 sold by Eastman Chemical Products, Inc. ®Myverol 18-85 is a distilled monoglyceride comprising roughly 18% mono-oleate, 53% mono-linoleate, 20% mono-palmitate and 3% mono-stearate, said percentages being based on the weight. The bottle is heated at 102° C. for 4 hours in an oil bath while being agitated by a tumbling action. After the completion of the impregnation, the beads are allowed to cool to below 40° C., decanted, washed thoroughly with distilled water and air-dried at room temperature. Thereafter 0.07 grams of a lubricant is applied to the surface of the beads.

The beads are pre-expanded using 2.5 psig steam for about 1.5 minutes to achieve a bulk density of 0.95 lb/ft$^3$. The pre-expanded beads are allowed to age overnight for drying and conditioning. The next day, the beads are molded in a laboratory one-liter mini-mold using 0.8 atm superheated steam. The inner cavity of the mini-mold device is disk-shape of about 5¾ inch diameter and 2¼ inch height. The cooling time of the molded article is measured as a time required for the reading of a pressure transducer provided in the mini-mold device to fall to 0.1 psig after the heating of the beads with hot steam has been terminated and the steam pressure released.

The cooling time of the beads obtained in this run (called Run A) as measured in this manner was 1.0 minute.

Three more runs (called Runs B, C and D) were repeated except that in Run B no ferric bromide or ®Myverol was used, in Run C 0.2 g of ®Myverol was used but no ferric bromide was used, and in Run D 0.02 g of ferric bromide was used but no ®Myverol was used. The results of the cooling time measurements were the following:

| Run A | 1    | minute  |
|-------|------|---------|
| Run B | 11   | minutes |
| Run C | 11   | minutes |
| Run D | 11.4 | minutes |

Comparison of the above results shows that neither ferric bromide nor ®Myverol alone is particularly effective for reducing the cooling time, but when combined they are very effective.

EXAMPLE 2

Five runs were conducted using the same experimental conditions as Example 1 except that instead of ®Myverol 18-85, the same amount of glycerol mono-soyate, glycerol mono-oleate, glycerol di-oleate, glycerol tri-oleate, and glycerol tri-linoleate were used. The glycerol mono-soyate sample used here is basically a derivative of soybean oil, and comprises roughly 20% mono-oleate, 54% Mono-linolenate and 5% mono-linoleate on the weight basis.

The cooling time for the five runs was measured in the same manner as Example 1. They were 1.0, 2.9, 3.4, 5.8 and 7.3 minutes for the runs using glycerol mono-soyate, glycerol mono-oleate, glycerol di-oleate, glycerol tri-oleate and glycerol tri-linoleate, respectively.

EXAMPLE 3

10 grams of dry FeCl$_3$ and 30 grams of dry KBr were added to about 100 ml of water in a beaker. The beaker was placed on a hot plate equipped with a magnetic stirring mechanism and the content was stirred with a magnetic bar. The heating was continued until the water was completely evaporated. The resultant powdery solid was mixed with 20 grams of molten ®Myverol to obtain a uniform premix.

Three runs (Runs A, B and C) were conducted by using respectively 0.4 g, 0.5 g and 0.6 g of the premix for impregnating 100 g of feedstock polystyrene beads. The impregnation temperature was 102° C. (215° F.) and the molding pressure 1.0 gauge atmosphere. A control run (Run D) using no metal halide or ®Myverol was also conducted. The other aspects of the experimental procedure were the same as Example 1.

The results of the cooling time were the following:

| | Amount of Premix* | Cooling Time (minutes) |
|---|---|---|
| Run A | 0.4 g | 3.9 |
| Run B | 0.5 g | 2.9 |
| Run C | 0.6 g | 1.0 |
| Run D | 0 | 11.8 |

*(10 g FeCl$_3$/30 g KBr/20 g ®Myverol)

EXAMPLE 4

A uniform premix was prepared from 0.6 g of CrBr$_3$ and 20 g of °Myverol. Four runs (Runs A, B, C and D) were conducted by using respectively 0.05 g, 0.10 g, 0.20 g and 0.30 g of the premix for impregnating 100 g of feedstock polystyrene beads. The other aspects of the experimental procedure were the same as Example 3. Hence, the control run of this example is the same as Example 3. The results of cooling time were the following:

| | Amount of Premix* | Cooling Time (minutes) |
|---|---|---|
| Run A | 0.05 g | 6.6 |
| Run B | 0.10 g | 3.4 |
| Run C | 0.20 g | 1.7 |
| Run D | 0.30 g | 0.7 |
| Control | 0 | 11.8 |

*(0.6 g CrBr$_3$/20 g ®Myverol)

EXAMPLE 5

Eight different premixes of ®Myverol with various transition metal compounds were prepared. The proportions of the ingredients of the premixes and the amounts of the premixes used for impregnating 100 g of feedstock polystyrene beads are listed in the table given below. The eight runs were designated Runs A through H. In Runs F, G and H a double decomposition product was first prepared by mixing a transition metal salt and potassium bromide in water and driving off the water, and then the resultant product was added to ®Myverol to prepare a uniform premix. In this Example, the cooling times were measured for various molding pressures covering a range of 0.6–1.2 gauge atmosphere and the maximum value of cooling time is reported for each run in the table given below. The impregnation temperature was 102° C. (215° F.). The cooling time for the control run is also reported as the maximum observed over a molding pressure range of 0.6–1.2 gauge atmosphere. The other aspects of the experimental procedure were the same as Example 1.

| | Amount of Premix | Composition of Premix | Cooling Time (Minutes) |
|---|---|---|---|
| Run A | 0.6 g | 2 g CrCl$_3$/20 g ®Myverol | 8 |
| Run B | 0.8 g | 2 g TiCl$_3$/20 g ®Myverol | 6.6 |
| Run C | 0.6 g | 2 g TiBr$_4$/20 g ®Myverol | <1 |
| Run D | 0.8 g | 2 g VBr$_3$/20 g ®Myverol | <1 |
| Run E | 0.2 g | 1.15 g FeBr$_3$/20 g ®Myverol | 1.8 |
| Run F | 0.6 g | 10 g Mn(III)acetate/30 g KBr/20 g ®Myverol | 11 |
| Run G | 0.6 g | 10 g CrCl$_3$/30 g KBr/20 g ®Myverol | 10 |
| Run H | 0.6 g | 10 g TiCl$_3$/30 g KBr/20 g ®Myverol | 8.3 |
| Control | 0 | — | 15 |

What is claimed is:

1. A method of making expandable styrene-type polymer beads wherein the polymer beads are impregnated with a blowing agent in an aqueous suspension medium comprising styrene-type polymer beads, a blowing agent, a suspending agent, at least 0.0001% of a halide salt of a transition metal selected from the group consisting of iron, titanium, vanadium, chromium, manganese, cobalt, nickel and copper, or a mixture thereof, and at least 0.001% of glycerol mono-, di-, or tri-ester of a fatty acid having 12–30 carbon atoms or a mixture thereof, said halide being bromide, chloride or iodide, and said percentages being based on the total weight of polymer beads subjected to the impregnation, with the proviso that if said glycerol ester is a tri-ester, ther must be present at least 0.0001% of a bromide salt of said transition metal or a mixture thereof.

2. A method according to claim 1 wherein the transition metal is iron.

3. A method according to claim 1 wherein the transition metal is titanium.

4. A method according to claim 1 wherein the transition metal is vanadium.

5. A method according to claim 1 wherein the transition metal is chromium.

6. A method according to claim 1 wherein the transition metal is manganese.

7. A method according to claim 2 wherein the suspension medium comprises at least 0.0001% of Fe(III) halide salt.

8. A method according to claim 7 wherein the suspension medium comprises at least 0.0001% of ferric bromide.

9. A method according to claim 3 wherein the suspension medium comprises at least 0.0001% of Ti(IV) halide salt.

10. A method according to claim 9 wherein the suspension medium comprises at least 0.0001% of Ti(IV) bromide.

11. A method according to claim 4 wherein the suspension medium comprises at least 0.0001% of V(III) halide salt.

12. A method according to claim 11 wherein the suspension medium comprises at least 0.0001% of V(III) bromide.

13. A method according to claim 5 wherein the suspension medium comprises at least 0.0001% of Cr(III) halide salt.

14. A method according to claim 13 wherein the suspension medium comprises at least 0.0001% of Cr(III) bromide.

15. A method according to claim 6 wherein the suspension medium comprises at least 0.0001% of Mn(III) halide.

16. A method according to claim 15 wherein the suspension medium comprises at least 0.0001% of Mn(III) bromide.

17. A method according to any one of claims 1–16 wherein the impregnation is conducted subsequent to a substantial completion of the polymerization of the monomer molecules.

18. A method according to claim 1 wherein said fatty acid has 12–22 carbon atoms.

19. A method according to claim 18 wherein the transition metal is iron.

20. A method according to claim 19 wherein the suspension medium comprises at least 0.0001% of Fe(III) halide salt.

21. A method according to claim 20 wherein the suspension medium comprises at least 0.0001% of ferric bromide.

22. A method according to claim 18 wherein the transition metal is titanium.

23. A method according to claim 22 wherein the suspension medium comprises at least 0.0001% of Ti(IV) halide salt.

24. A method according to claim 23 wherein the suspension medium comprises at least 0.0001% of Ti(IV) bromide.

25. A method according to claim 18 wherein the transition metal is vanadium.

26. A method according to claim 25 wherein the suspension medium comprises at least 0.0001% of V(III) halide salt.

27. A method according to claim 26 wherein the suspension medium comprises at least 0.0001% of V(III) bromide.

28. A method according to claim 18 wherein the transition metal is chromium.

29. A method according to claim 28 wherein the suspension medium comprises at least 0.0001% of Cr(III) halide salt.

30. A method according to claim 29 wherein the suspension medium comprises at lest 0.0001% of Cr(III) bromide.

31. A method according to claim 18 wherein the transition metal is manganese.

32. A method according to claim 31 wherein the suspension medium comprises at least 0.0001% of Mn(III) halide salt.

33. A method according to claim 32 wherein the suspension medium comprises at least 0.0001% of Mn(III) bromide.

34. A method according to any one of claims 18–33 wherein the impregnation is conducted subsequent to a substantial completion of the polymerization of the monomer molecule.

* * * * *

UNITED STATES PATENT AND TRADEMARK OFFICE
CERTIFICATE OF CORRECTION

PATENT NO. : 4,361,656
DATED : November 30, 1982
INVENTOR(S) : Mohamed A. Mostafa It is certified that error appears in the above—identified patent and that said Letters Patent is hereby corrected as shown below:

Col. 1, line 16, "Factor" should read -- reactor --;

Col. 1, line 29, "0.001 %" should read -- 0.0001 %--;

Col. 5, line 59, "respective" should read -- representative --;

Col. 10, lines 43 - 44, "mono-linoleate", second occurrence, should read -- mono-linolenate --;

In the claims:

Claim 30, line 2, "at lest" should read -- at least --.

Signed and Sealed this

Nineteenth Day of April 1983

[SEAL]

Attest:

GERALD J. MOSSINGHOFF

Attesting Officer   Commissioner of Patents and Trademarks